United States Patent
Mattson

[11] Patent Number: 5,987,373
[45] Date of Patent: Nov. 16, 1999

[54] DIAGNOSTIC APPARATUS AND METHOD FOR DETECTING NOISE ON A COMBUSTION SENSOR FEEDBACK SYSTEM

[75] Inventor: George W. Mattson, Lacon, Ill.

[73] Assignee: Caterpillar Inc., Peoria, Ill.

[21] Appl. No.: 08/931,731

[22] Filed: Sep. 16, 1997

[51] Int. Cl.[6] ...................................................... F02P 5/15
[52] U.S. Cl. ...................... 701/111; 701/115; 73/117.3; 123/406.41
[58] Field of Search ................................ 701/111, 102, 701/115; 73/117.3; 123/406.41, 435

[56] References Cited

U.S. PATENT DOCUMENTS

| | | | |
|---|---|---|---|
| 4,506,505 | 3/1985 | Damson et al. | 701/111 |
| 4,622,638 | 11/1986 | Anderson et al. | 701/111 |
| 4,922,874 | 5/1990 | Debiasi et al. | 123/406.65 |
| 4,944,271 | 7/1990 | Iwata et al. | 123/406.41 |
| 5,036,669 | 8/1991 | Earleson et al. | 60/602 |
| 5,125,381 | 6/1992 | Nutton et al. | 73/116 |
| 5,189,373 | 2/1993 | Murata et al. | 324/399 |
| 5,396,176 | 3/1995 | Ishii et al. | 123/479 |
| 5,452,603 | 9/1995 | Asano et al. | 73/116 |

FOREIGN PATENT DOCUMENTS 2282221 3/1995 United Kingdom .............. F23N 5/10

*Primary Examiner*—Willis R. Wolfe
*Assistant Examiner*—Hieu T. Vo

[57] ABSTRACT

A method for detecting noise on a conductive path utilized for conducting combustion signals produced by a combustion sensor of an internal combustion engine is disclosed. Essentially, the combustion sensor, when operable, produces combustion signals responsive to the occurrence of combustion conditions in a combustion chamber of the engine. According to the present invention, the conductive path is monitored for noise signals at a time when the combustion signal is not expected to occur, such that, logically, any noise signal present will be discovered. A controller is connected to a conductive path for conducting combustion signals produced by a combustion sensor and is operable to monitor the conductive path for noise signals during a time when it is not monitoring for an expected combustion signal.

12 Claims, 2 Drawing Sheets

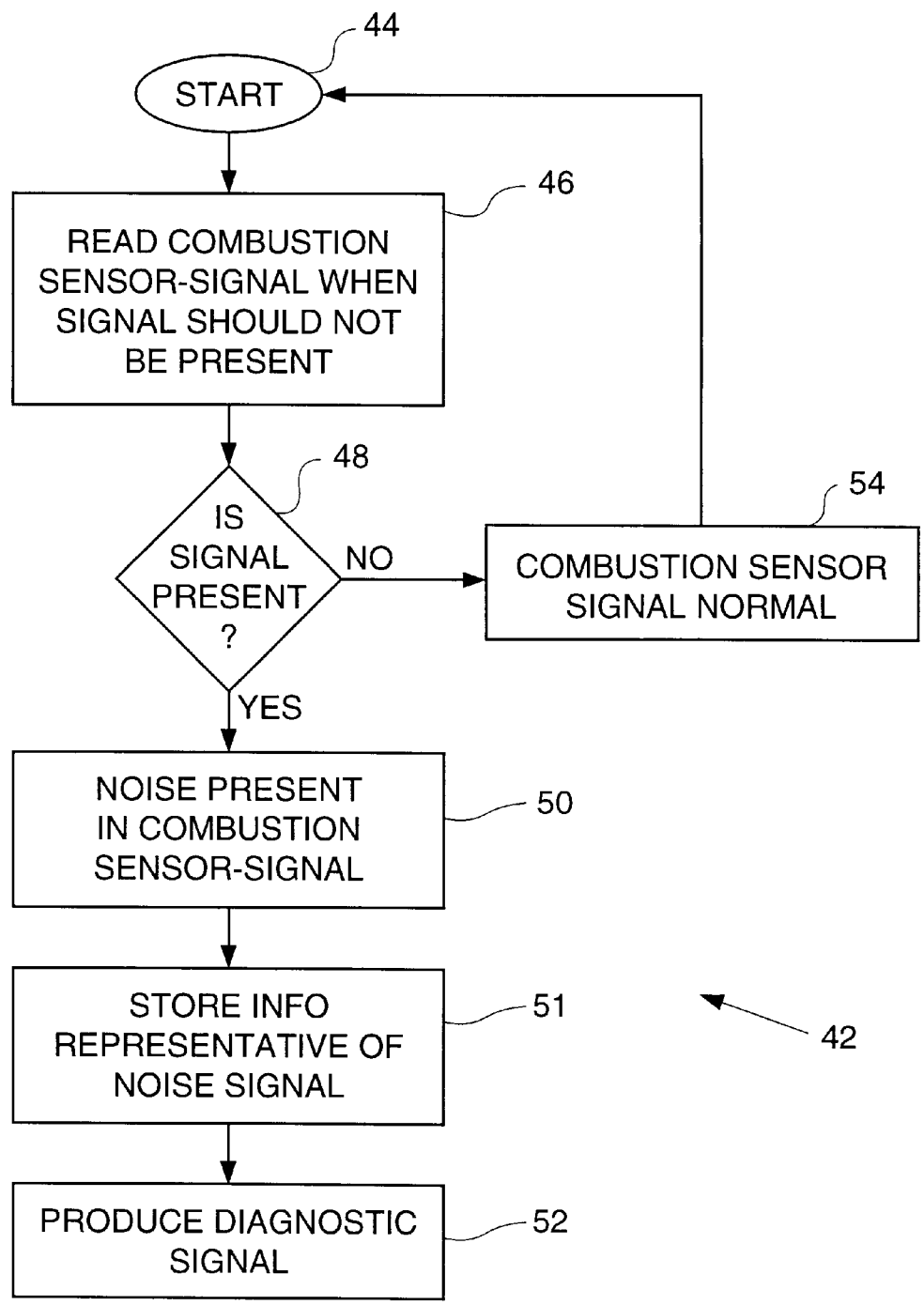

DIAGNOSTIC APPARATUS AND METHOD FOR DETECTING NOISE ON A COMBUSTION SENSOR FEEDBACK SYSTEM

TECHNICAL FIELD

This invention relates generally to a diagnostic apparatus and method for detecting noise on a combustion sensor feedback system of an internal combustion engine and more particularly to an apparatus and method for determining if noise is affecting a combustion sensor signal communicated to other components of the engine such as an electronic controller.

BACKGROUND ART

Currently, in many internal combustion engines an electronic controller is used to control the air fuel mixture delivered to a combustion chamber of a cylinder of the engine, and produce a timed ignition signal in response to sensed engine parameters to ignite the mixture in engines that are spark ignited. Generally, the timed ignition signal is delivered to a spark plug which is disposed centrally in the combustion chamber, and a flame is produced when the spark ignites the air fuel mixture. In the case of both spark ignited engines and other types of engines, for a given combustion chamber, there is a period of time, typically commenced by the timed ignition signal, and extending for a predetermined time period thereafter wherein it is expected that a desired good combustion condition will occur. Then, before the beginning of the next subsequent combustion time period for expected good combustion, there is a time interval wherein such events as combustion in other cylinders of multiple cylinder engines occur, combustion products are exhausted from the combustion chamber, and a subsequent intake charge enters the combustion chamber.

A combustion sensor, which can be an ion probe, optical device, thermocouple, or like device, is typically also located in the combustion chamber. Examples of conventional combustion sensors and systems are shown in Earleson et al., U.S. Pat. No. 5,036,669, issued Aug. 6, 1991; Maddock et al., U.S. Pat. No. 5,041,980, issued Aug. 20, 1991; McCombie, U.S. Pat. No. 5,392,641, issued Feb. 28, 1995; and Wood, UK patent application GB 2282221, published Mar. 29, 1995. In operation, a combustion sensor typically produces a combustion signal in response to the presence of a predetermined combustion condition in the combustion chamber, such as, in the case of an ion probe, the flame propagating past the ion probe. The combustion signal, typically a DC voltage signal for an ion probe, is communicated to the electronic controller via a conductive path that often includes a wiring harness or the like. In some systems, the combustion sensor and/or conductors making up the conductive path which extends from the combustion sensor to the electronic controller are located in an area of high vibration and noise generation, such as noise generated by the ignition spark in that or another cylinder, or by electro-magnetic interference from a nearby antenna. This vibration and external noise can produce a noise signal on the conductive path connecting the combustion sensor with the electronic controller, which noise signal is typically a recurring pulse signal. The combustion signal is generally also a pulse signal, and as a result, some types of noise signals on the conductive path can appear to the electronic controller as valid combustion signals.

A problem that can occur when noise signals are present on a conductive path connecting the combustion sensor and the electronic controller is that the controller may misidentify or misinterpret the noise signals as combustion signals, or read the signals together, then change the operating parameters of the engine controlled by the controller based on such erroneous signals. This is particularly problematic when the erroneous signals are such as to cause the controller to cutout a properly operating engine cylinder.

Accordingly, the present invention is directed to overcoming one or more of the problems as set forth above.

DISCLOSURE OF THE INVENTION

In one aspect of the present invention, a method for detecting noise on a conductive path utilized for conducting combustion signals produced by a combustion sensor of an internal combustion engine is disclosed. Essentially, the combustion sensor, when operable, produces combustion signals responsive to the occurrence of combustion conditions in a combustion chamber of the engine. According to the present invention, the conductive path is monitored for noise signals at a time when the combustion signal is not expected to occur, such that, logically, any noise signal present will be discovered.

It has been observed that noise signals on a conductive path for combustion signals, such as those signals resulting from vibration, electro-magnetic interference and the like, are typically present throughout both the combustion signal time period, that being the time period during which the combustion signal is expected to occur, as well the time interval after the combustion signal time period and before the next occurring combustion signal time period begins. Typically the electronic controller only operates to monitor the conductive path for the combustion signal during a predetermined combustion signal time period. Therefore, any time during the time interval beginning at about the end of one combustion signal time period and ending at about the beginning of the next occurring combustion signal time period provides a convenient time to monitor the conductive path to determine if any noise signals are present.

Accordingly, in another aspect of the present invention, a controller is connected to a conductive path for conducting combustion signals produced by a combustion sensor and is operable to monitor the conductive path for noise signals during a time when it is not monitoring for the combustion signal. This will be most conveniently done at some time during the time interval beginning at about the end of one combustion signal time period, that being the time period during which the combustion signal is monitored for, and ending at about the beginning of the next occurring combustion signal time period.

Again, if a signal is present during the selected noise monitoring time, the controller can logically determine that that signal represents noise which may also be present in the monitored combustion sensor signal. The controller can then optionally produce a diagnostic signal indicative of the noise condition. The diagnostic signal can be stored in memory for retrieval by service personnel, sent to a service tool and/or broadcast to a display device to alert an operator of the condition.

BRIEF DESCRIPTION OF DRAWINGS

For a better understanding of the present invention, reference may be made to the accompanying drawings in which:

FIG. 3 is a high level flow diagram showing operation of the controller of FIG. 1 in accordance with the present invention for detecting the presence of a noise signal on the conductive path connecting the combustion sensor to the controller.

BEST MODE FOR CARRYING OUT THE INVENTION

Figure 1:
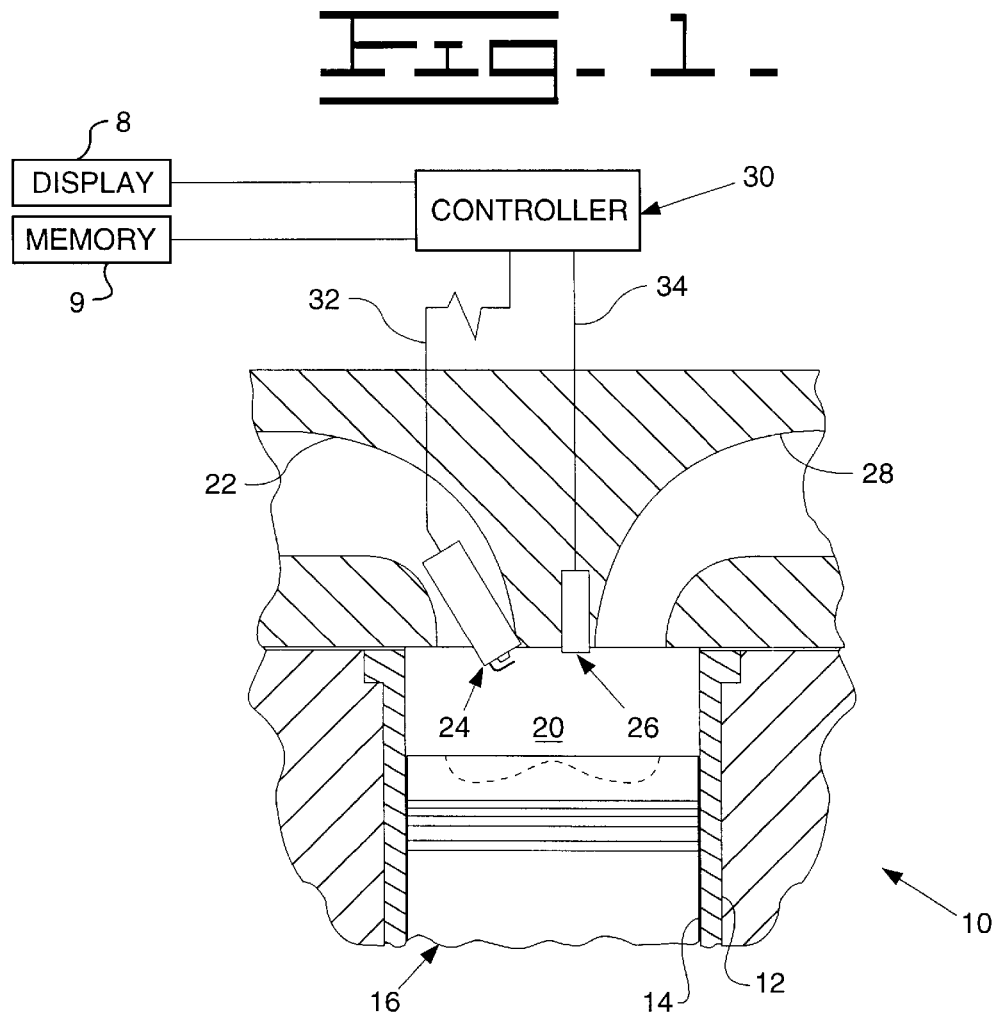
FIG. 1 is a fragmentary cross-sectional view of a typical cylinder of an internal combustion engine including a spark plug and a combustion sensor in communication with the combustion chamber of the engine and an electronic controller of the engine incorporating the present invention.

Referring now to the drawings, wherein a preferred embodiment of the present invention is shown, FIG. 1 identifies a typical internal combustion engine 10 including a tubular cylinder liner 12 which forms a cylinder 14. Engine 10 is representative of a wide variety of internal combustion engines including both single cylinder engines and multiple cylinder engines which use a wide variety of fuels including, gasoline, diesel fuel, alcohols and methane, to name just a few types of engines with which the present invention is usable. Cylinder 14 of engine 10 contains a piston 16 reciprocally movable therein in the usual manner, in connection with a crankshaft of the engine (not shown). Engine 10 further includes a head 18 enclosing one end of cylinder 14 to form a combustion chamber 20.

Head 18 of engine 10 includes an intake port 22 extending therethrough in communication with combustion chamber 20 for the passage of an air fuel mixture into the combustion chamber, a conventional spark plug 24 for igniting the air fuel mixture, a conventional combustion sensor 26 for sensing combustion in the combustion chamber, and an exhaust port 28 extending through head 18 in communication with the combustion chamber for exhausting the products of combustion therefrom.

Engine 10 includes a controller 30 for controlling the air fuel mixture delivered to combustion chamber 20 and delivery of ignition signals to spark plug 24 via wire 32. The controller 30 is also preferably connected with a memory device 9 and a display 8. Combustion sensor 26 is an ion probe operable to produce a combustion signal when a flame front from combustion in combustion chamber 20 passes by the probe. The combustion signal has a combustion quality indicative voltage level and is communicated to controller 30 over a conductive path which typically includes a wiring harness. Here it should be noted that conductive path 34 is of conventional construction and can include one or more lengths of wire which can be connected together and with combustion sensor 26 and controller 30 by conventional electrical connectors or in any other conventional manner.

It should be understood that conductive paths 34 connecting combustion sensors with engine controllers, such as a wiring harness, are subjected to near constant vibration from the engine operation. Also, such conductive paths are often located in proximity to sources of electronic noise such as ignition sparks, and electro-magnetic interference. This vibration and noise can be picked up by the conductive path and transmitted or communicated thereby to the electronic controller. Resultant problems from this noise can include alterations to engine operating parameters made by the electronic controller, including cutting out a properly operating cylinder. One of the optimum engine operating conditions is to have all of the functional cylinders operating, therefore, it is highly desirable to be able to identify the presence of a noise signal on the conductive path and eliminate or substantially reduce its impact on engine operation.

Figure 2:
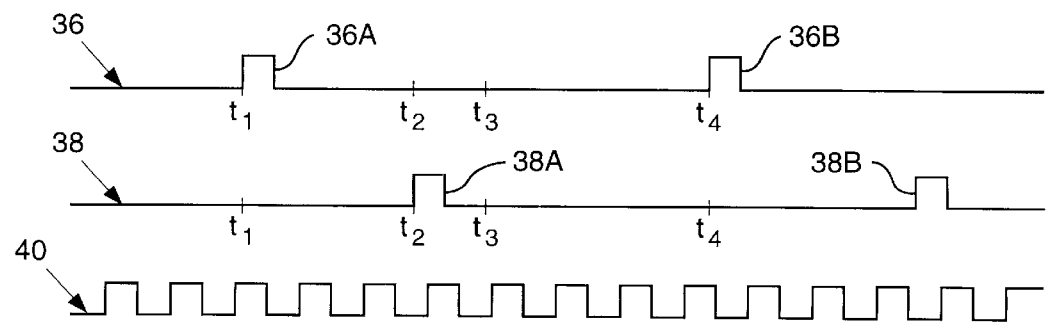
FIG. 2 is a diagrammatic representation of signal traces for an ignition signal and a combustion sensor signal of the engine of FIG. 1, along with a trace of a typical noise signal that can be present on the conductive path connecting the controller with the combustion sensor.

To better illustrate this problem, reference is made to FIG. 2 which shows several signal traces, including an ignition signal trace 36 including ignition signal pulses 38A and 38B produced by controller 30; a combustion signal trace 38 including combustion signal pulses 36A and 36B produced by combustion sensor 26; and a higher frequency noise signal trace 40 representative of a typical pulsating noise signal resulting from vibration present on the conductive path 34, such as a wiring harness, extending between the combustion sensor 26 and the engine controller 30. In each case, the vertical direction represents the pulse amplitude, and the horizontal direction represents time, the traces 36, 38 and 40 not necessarily being to scale. Examining traces 36 and 38, it can be seen that an ignition signal pulse 36A occurs, followed after some period of time by the combustion signal pulse 38A, and, after some time interval, the next subsequent ignition signal pulse 36B occurs followed by a combustion signal pulse 38B, and so on. Importantly, examining signal trace 40, it is seen that the signal pulsates at a higher frequency. Trace 40 has been found to be fairly representative of actual noise signal conditions observed on conductive paths for combustion signals. Under conventional circumstances the controller will monitor conductive path 34 for the combustion signal during a combustion signal time period during which the combustion signal 38A is expected to occur. Such combustion signal time period might typically extend from the time of ignition signal 36A, or $t_1$, to a time such as $t_3$. Of course, the combustion signal time period may vary. For example, the combustion signal time period may begin slightly before time $t_1$ if the controller is also checking for the occurrence of precombustion in the combustion chamber 20. Further, the combustion signal time period may begin at some time between times $t_1$ and $t_2$, particularly where it is desirable to eliminate the possibility that the ignition signal 38A is a source of noise. It is also recognized that, depending upon the operating speed of the engine, the time period from time $t_3$ to time $t_4$ may vary. Regardless of the exact duration of the combustion signal time period, there is the possibility that a noise signal 40 present on conductive path 34 during the combustion signal time period could be mistaken as the combustion signal, or, otherwise interfere or alter the combustion signal, whereby controller 30 could improperly alter engine operating parameters under its control based upon the affect of the noise signal. Here it should be noted that one of the characteristics of the combustion signal that can affect how the controller changes the operating parameters is the timing of the combustion signal. That is, if the combustion signal is received by controller 30 at a time that is considered early or late relative to the ignition signal, the controller may alter the air fuel mixture, or another operating parameter to improve operation. Hence, poorer engine operation can result if an earlier noise signal is mistakenly interpreted by the controller to be the combustion signal.

To overcome the noise signal problem set forth above, controller 30 is operable at one or more times during the time interval beginning at about the end of one combustion signal time period, or $t_3$ as described above, and ending at about the beginning of the next subsequent combustion signal time period or $t_4$ as described above, to monitor conductive path 34 for signals. If a signal is detected on conductive path 34, controller 30 can determine that the signal is noise, and furthermore, that the noise will also likely be present during the combustion signal time period, and can operate accordingly, including producing an optional diagnostic signal. If, on the other hand, no signal is present, it is likely that the combustion sensor signal does not contain noise and is thus normal.

FIG. 3 shows a high level flow diagram 42 illustrating the operation of controller 30 for detecting a noise signal on conductive path 34. Referring to diagram 36, starting with start block 44 controller 30 is operable to read signals on conductive path 34 at a time when no signal should be present, as represented by block 46. This step will occur sometime during the time interval after the end of one combustion signal time period and before the beginning of a next occurring combustion signal time period, or between time $t_3$ and time $t_4$ as described above. Then, as indicated by decision block 48, if a signal is present, a determination is made that noise is present in the combustion sensor signal as shown by block 50. In this instance, the controller can operate accordingly, including, in one embodiment storing data representative of the noise signal in a memory device 9 as shown in block 51, or in another embodiment producing a diagnostic signal as shown by block 52. If, on the other hand, no signal is present, indicating no noise signal, the controller will make the determination that the combustion sensor signal is normal as shown by block 54 and proceed to monitor conductor 34 again at the next designated time. As noted above, when a determination is made that noise is present on the conductive path, the diagnostic signal can be stored in memory either contained in the controller itself or external thereto, supplied to a service tool, and/or broadcast to an operator display, such that the problem can be more rapidly and accurately diagnosed and corrected.

INDUSTRIAL APPLICABILITY

The present diagnostic apparatus and method for detecting noise on a combustion sensor feedback system has applicability for a wide variety of internal combustion engine applications, including vehicular applications, as well industrial, gas compression, electric power generation, and co-generation applications, using a wide range of fuels. Operational objectives for all such engines include high output, low emissions, high thermal efficiency and precise control of engine operating parameters. The present diagnostic apparatus and method achieve these objectives by enabling an electronic controller to essentially determine when a noise signal is present on a conductive path for a combustion signal, to avoid improperly adjusting engine operating parameters or needlessly terminating combustion in a cylinder. This results in improved overall engine operation without significant added costs or complexity.

Other aspects, objects and advantages of the present invention can be obtained from a study of the drawings, the disclosure and the appended claims.

What is claimed is:

1. A method for detecting noise on a conductive path for combustion signals produced by a combustion sensor of an internal combustion engine, the combustion sensor when operable producing the combustion signals responsive to the occurrence of combustion conditions in a combustion chamber of the engine, the method comprising the steps of:

(a) monitoring the conductive path for a combustion for a combustion signal during a predetermined combustion signal time period;

(b) monitoring the conductive path for a combustion for a noise signal at a time other than during a predetermined combustion signal time period; and (c) producing a diagnostic signal if a noise signal is detected in step (b).

2. An apparatus for detecting the presence of noise on a conductive path for combustion signals produced by a combustion sensor of an internal combustion engine, the combustion sensor when operable producing the combustion signals responsive to the occurrence of combustion conditions in a combustion chamber of the engine, the apparatus comprising:

a controller connected to the conductive path and operable to monitor the conductive path for a combustion signal during a predetermined combustion signal time period, the controller further operable to monitor the conductive path for a noise signal at a time other than during the predetermined combustion signal time period.

3. The apparatus, as set forth in claim 2, wherein the controller is further operable to produce a diagnostic signal when a noise signal is detected.

4. The apparatus, as set forth in claim 3, further comprising a display device operable to receive the diagnostic signal and produce an output signal when the diagnostic signal is received.

5. The apparatus, as set forth in claim 2, further comprising a memory device and wherein the controller is operable to store information representative of a detected noise signal in the memory device.

6. The apparatus, as set forth in claim 2, wherein the controller is operable to monitor the conductive path at least one selected time between two successively occurring predetermined combustion signal time periods.

7. An apparatus for detecting noise on a conductive path for combustion signals produced by a combustion sensor of an internal combustion engine responsive to combustion conditions occurring in a combustion chamber of the engine during predetermined time periods, the apparatus comprising;

a controller connected to the conductive path for receiving signals therefrom and operable during at least one selected time interval between successive predetermined time periods to monitor the conductive path for the presence of noise signals.

8. The method, as set forth in claim 7, wherein the predetermined combustion signal time period runs from a time when an ignition signal is produced to a predetermined time thereafter.

9. The method, as set forth in claim 7, wherein, in step (b), the conductive path is monitored for a predetermined period of time.

10. The method, as set forth in claim 7, wherein the internal combustion engine further comprises a memory device, and the method comprises the further step of:

storing information representative of a detected noise signal in the memory device.

11. The method, as set forth in claim 10, comprising the further step of:

retrieving the information representative of a noise signal from the memory device.

12. The method, as set forth in claim 7, further comprising a controller having an input connected to the conductive path, the controller being operable to perform the monitoring step through the input.

* * * * *